(12) United States Patent
Yeo et al.

(10) Patent No.: US 7,397,460 B2
(45) Date of Patent: Jul. 8, 2008

(54) DISPLAY DEVICE INCLUDING LAMP DRIVING CIRCUIT

(75) Inventors: Jeong-Deuk Yeo, Jinju-si (KR); Kang-Ju Lee, Gumi-si (KR)

(73) Assignee: LG. Display Co., Ltd, Seoul (KR)

( * ) Notice: Subject to any disclaimer, the term of this patent is extended or adjusted under 35 U.S.C. 154(b) by 0 days.

(21) Appl. No.: 11/321,342

(22) Filed: Dec. 29, 2005

(65) Prior Publication Data

US 2006/0291184 A1   Dec. 28, 2006

(30) Foreign Application Priority Data

Jun. 28, 2005   (KR) .................... 10-2005-0056097

(51) Int. Cl.
*G09G 5/00* (2006.01)
(52) U.S. Cl. .................. 345/102; 345/38; 349/61; 362/613; 362/630
(58) Field of Classification Search ............... 362/613, 362/630, 217, 221; 349/58, 61
See application file for complete search history.

(56) References Cited

U.S. PATENT DOCUMENTS

| | | | |
|---|---|---|---|
| 7,084,583 B2 * | 8/2006 | Hur et al. .................. 315/291 |
| 2004/0233663 A1 * | 11/2004 | Emslie et al. ............... 362/221 |
| 2004/0246394 A1 * | 12/2004 | Ono et al. .................... 349/53 |
| 2005/0146291 A1 * | 7/2005 | Lee ............................ 315/308 |
| 2005/0180083 A1 * | 8/2005 | Takahara et al. ........... 361/152 |
| 2005/0218827 A1 * | 10/2005 | Ushijima et al. ........... 315/224 |
| 2005/0269973 A1 * | 12/2005 | Jang et al. .................. 315/307 |
| 2006/0139013 A1 * | 6/2006 | Yoo et al. ................... 323/201 |

* cited by examiner

*Primary Examiner*—Ali Alavi
*Assistant Examiner*—Evan Dzierzynski
(74) *Attorney, Agent, or Firm*—Brinks Hofer Gilson & Lione

(57) ABSTRACT

A display device includes a display panel; a plurality of lamps facing the display panel and arranged in parallel; and at least one transformer connected to the plurality of lamps, wherein the at least one transformer is disposed at a lower portion of the display device adjacent to a ground. A transformer may include a driving transformer and a compensation transformer, where the compensation transformer may be connected to one or more lower lamps and the driving transformer may be connected to the remainder of the lamps. The output voltages of the compensation transformer and the driving transformer may differ.

15 Claims, 4 Drawing Sheets

DISPLAY DEVICE INCLUDING LAMP DRIVING CIRCUIT

The present invention claims the benefit of Korean Patent Application No. 2005-0056097, filed in Korea on Jun. 28, 2005, which is hereby incorporated by reference.

TECHNICAL FIELD

The present application relates to a display device and, more particularly, to a display device including a lamp driving circuit.

BACKGROUND

Display devices have typically used cathode-ray tubes (CRT). Presently, much effort has been made to study and develop various types of flat panel displays, such as liquid crystal display (LCD) devices, plasma display panels (PDP), field emission displays, and electro-luminescence displays (ELD), as a substitute for CRT. Of these, flat panel displays and LCD devices have advantages, such as high resolution, light weight, thin profile, compact size, and low power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field, thereby changing the light transmissivity of the LCD device. Thus, the LCD device displays images by varying the intensity of the induced electric field. LCD devices are non-luminous display devices in that they cannot display images without some light source (e.g., ambient light or a backlight).

A backlight unit for the LCD device is categorized as a direct type or an edge type. The direct type backlight unit has a plurality of lamps directly below a liquid crystal panel, and the edge type backlight unit has a lamp at a side of the liquid crystal panel. The direct type backlight unit uniformly supplies light to the liquid crystal panel and, in particular, the large sized liquid crystal panel.

As illustrated in FIG. 1, a liquid crystal display module includes a liquid crystal panel 13, a backlight unit 20, a main support 17, a bottom cover 27 and a top cover 11.

The backlight unit 20 includes a plurality of lamps 23 arranged in parallel below the liquid crystal panel 13, a reflector 21 and a plurality of optical sheets 19 including prism and diffusion sheets. The plurality of lamps 23 are retained by a pair of lamp guides 25 combined with the bottom cover 27. The main support 17 surrounds peripheral portions of the backlight unit 20 and is combined with the bottom cover 27. The liquid crystal panel 13 is laid on the backlight unit 20. The top cover 11 is combined with the bottom cover 27 such that the backlight unit 20 and the liquid crystal panel 13 are retained thereby. The lamp 23 includes a CCFL (cold cathode fluorescent lamp) having electrodes at both ends. The electrodes of the CCFL are supplied with driving voltages to supply light to the liquid crystal panel 13.

FIG. 2A is a plan view illustrating lamps and a driving circuit for lamps of a direct-type backlight unit, and FIG. 2B is a plan view illustrating lamps and another driving circuit for lamps of a direct-type backlight unit.

As illustrated in FIG. 2A, a plurality of lamps 23 are arranged in parallel, and the lamp 23 has a glass tube. The glass tube is filled with a discharge gas including an inert gas and mercury (Hg). A fluorescent material layer is formed on an inner surface of the glass tube. First and second (left and right) electrodes are formed on ends of the glass tube.

The lamp 23 of FIG. 2A is operated by a high-high method. In other words, each of the both electrodes is supplied with a high voltage. When the lamp 23 is operated by a high-low method i.e., high and low voltages are supplied to the electrodes, as a length of the lamp 23 increases, a power operating the lamp 23 increases. Accordingly, when the lamp 23 is operated with the high and low voltages, the lamp 23 is problematic for the large sized LCD device. Therefore, high voltages are supplied to the both electrodes of the lamp 23 to operate the large sized LCD device. To operate the lamp 23 with high voltages, a ground portion (ground terminal) is disposed at a center portion of the lamp 23. The high voltages supplied to the lamp 23 are AC (alternating current) voltages.

To supply the AC high voltage, a driving circuit is used. The driving circuit includes a plurality of inverters 33 and a plurality of transformers 31 each connected to each electrode of the plurality of lamps 23. The inverter 33 converts a source voltage into an AC voltage, and the transformer 31 increases the AC voltage from the inverter 33 so as to output a AC high voltage. The AC high voltage outputted from each transformer 31 is supplied to each electrode of the lamps 23, and thus the lamps 23 are operated independently from each other. As the lamps 23 are operated separately, transformers 31 and inverters 33 corresponding to the both electrodes of the lamps 23 are required. Accordingly, as a size of the LCD device increases, and a number of lamps 23 increases, and also, a number of the transformer 31 and the inverters 33 increase. Therefore, fabrication cost increases.

As illustrated in FIG. 2B, a plurality of lamps 23 are arranged in parallel and operated by a high-high method, as similarly in FIG. 2A. Each lamp 23 has first and second (left and right) electrodes. Each of the first and second electrodes is supplied with high voltages. The first electrodes are supplied with the high voltage from one or two transformers and inverters 31 and 33, and the second electrodes are supplied with the high voltage from one or two transformers and inverters 31 and 33. In other words, the driving circuit of FIG. 2B includes the fewer transformers 31 and inverters 33 than the driving circuit of FIG. 2A, and thus fabrication cost is reduced.

However, lamp currents flowing in the outermost lamps 23 (that is, the lamps at the top and the bottom of a plurality of lamps arranged in parallel) are distorted due to structure and thermal distribution of the LCD device. With regard to the structure of the LCD device, since upper and lower portions of the bottom cover (27 of FIG. 1) are made of metal are bent toward a front, the bent upper portion forms a parasitic capacitor with the uppermost lamps 23 adjacent to the bent upper portion, and the bent lower portion forms a parasitic capacitor with the lowermost lamps 23 adjacent to the bent lower portion. Since the parasitic capacitor causes leakage of the lamp currents, the lamp currents in the outermost lamps are distorted.

In addition, with regard to the thermal distribution of the LCD device, there is difference of temperature between the upper portion and the lower portion of a space where the lamps are arranged. When a user looks at the LCD device displaying an image, the lowermost lamps face a ground and the uppermost lamps face a sky. When the lamps 23 are operated, heat is generated by the transformers 31 at the center portion of the LCD device. The generated heat moves toward an upper portion of the space where the lamps are arranged. Therefore, the upper portion of the space has a higher temperature and the lower portion of the space has a lower temperature. Non-uniformity of the thermal distribution in the space causes distortion of the lamp currents in the lamps.

As a result, due to the structure and thermal distribution of the LCD device, the lamp currents in the outermost lamps and, in particular, in the lowermost lamps, are distorted.

SUMMARY

A display device is disclosed, which includes a display panel; a plurality of lamps facing the display panel and arranged in parallel; and a transformer connected to the plurality of lamps, wherein the transformer is disposed at a lower portion of the display device.

In another aspect, a display device includes a display panel; a plurality of lamps facing the display panel and arranged in parallel; and a transformer connected to the plurality of lamps, wherein the transformer is arranged in a space inside the display device such that thermal distribution is substantially uniform in the space.

DETAILED DESCRIPTION OF THE PREFERRED EMBODIMENTS

Exemplary embodiments may be better understood with reference to the drawings, but these examples are not intended to be of a limiting nature. Like numbered elements in the same or different drawings perform equivalent functions.

Figure 3:
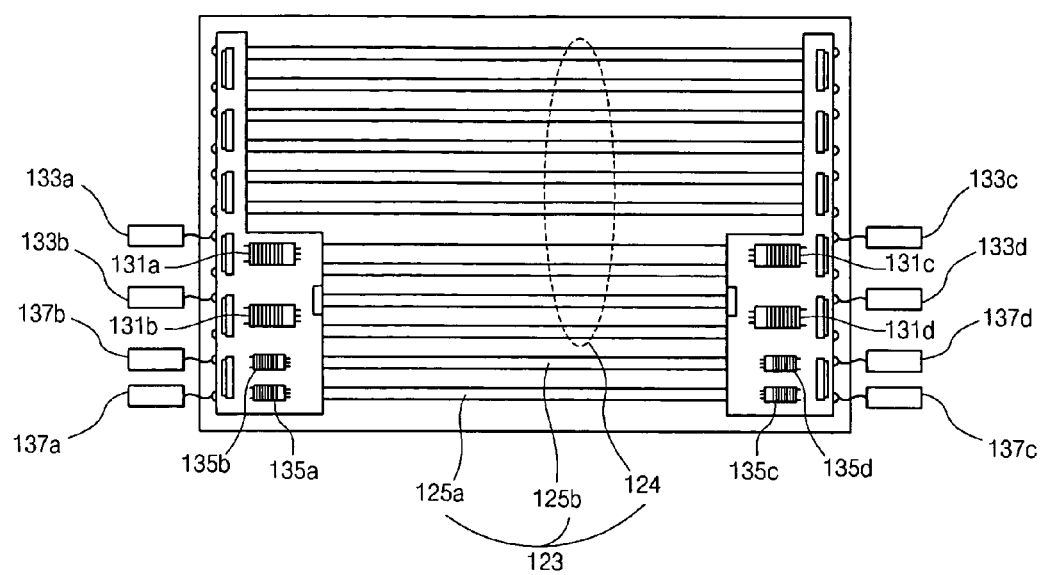
FIG. 3 is a schematic plan view illustrating lamps and a driving circuit for lamps of a direct type backlight unit according to an exemplary embodiment.

FIG. 3 is a schematic plan view illustrating lamps and a driving circuit for lamps of a direct type backlight unit according to an exemplary embodiment of the present invention.

Figure 1:
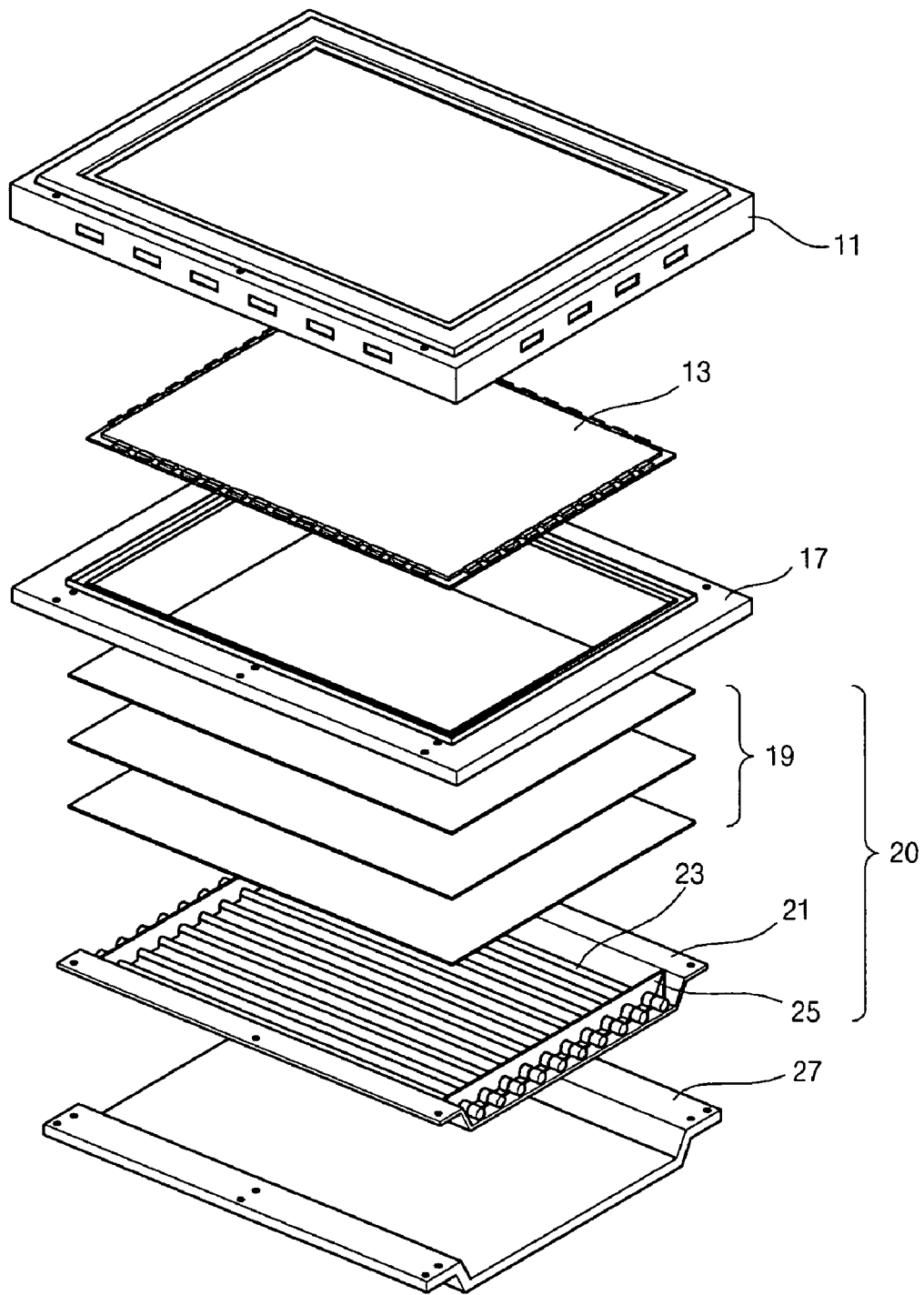
FIG. 1 is a perspective view illustrating a liquid crystal display module including a direct-type backlight unit according to the related art.
Figure 2A:
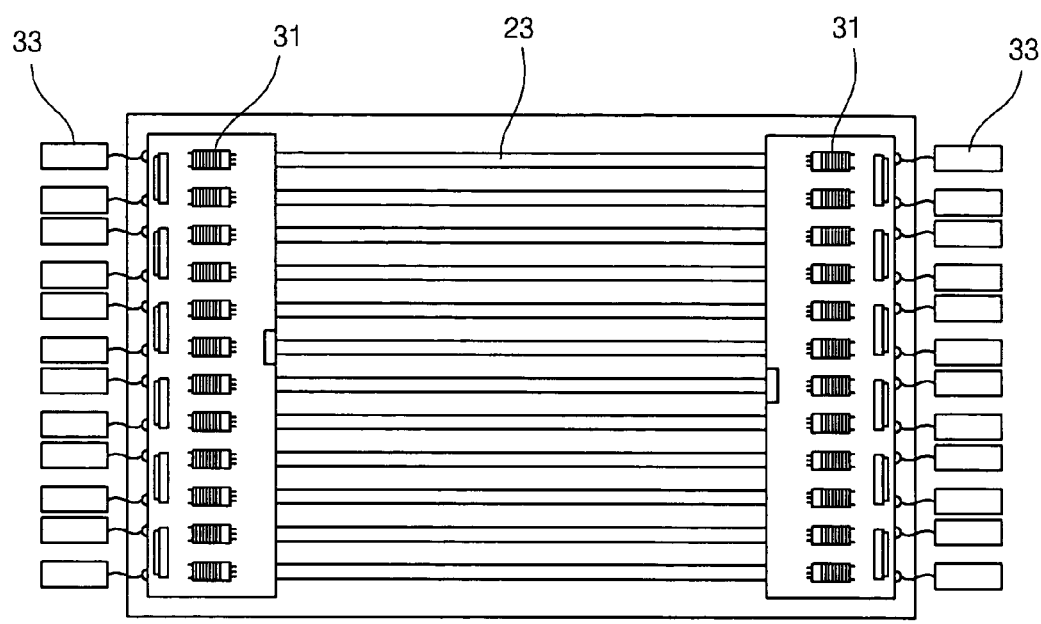
FIG. 2A is a schematic plan view illustrating lamps and a driving circuit for lamps of a direct type backlight unit according to the related art.
Figure 2B:
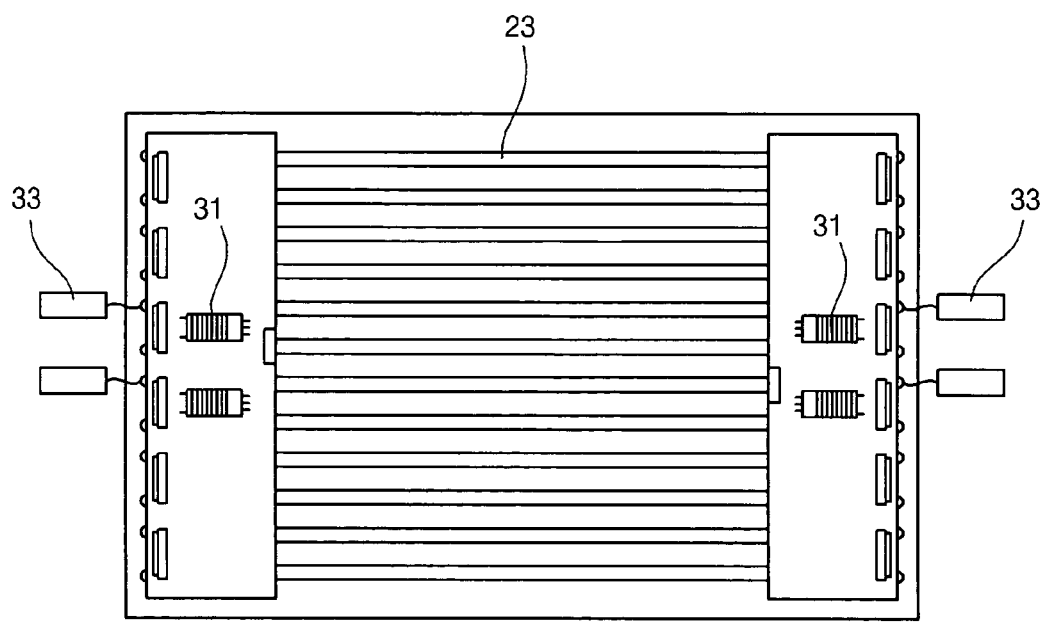
FIG. 2B is a schematic plan view illustrating lamps and another driving circuit for lamps of a direct type backlight unit according to the related art.

As illustrated in FIG. 3, a plurality of lamps 123 of a backlight unit are arranged in parallel, and the lamp 123 has a glass tube. The lamps 123 directly face a rear surface of a liquid crystal panel (13 of FIG. 1) such that they uniformly supply light to the entire liquid crystal panel. The lamps 123 are arranged in a space defined between the liquid crystal panel and the bottom cover (27 of FIG. 1). When a user looks at the LCD device displaying an image, a lower portion of the lamps-arranged space is closer to a floor and an upper portion of the lamp-arranged space faces a ceiling. The lamps 123 are divided into, for example, two lowermost lamps 125a and 125b and the rest of the lamps 124.

The glass tube of the lamp 123 is filled with a discharge gas including an inert gas and mercury (Hg). A fluorescent material layer is formed on an inner surface of the glass tube. First and second (left and right) electrodes of each lamp 123 are formed on ends of the glass tube.

The lamp 123 is operated by a high-high method. In other words, each of the electrodes is supplied with a high voltage.

To operate the lamp 123 with high voltages, a ground portion is disposed at a center portion of the lamp 123. The high voltages supplied to the lamp 123 are AC (alternating current) voltages.

When the high AC voltages are applied to the first and second electrodes, the discharge gas enters a plasma state. In other words, due to the high voltages, electrons are generated in the lamp 123, then the electrons collide with the discharge gas, and thus electrons abruptly increases in the lamp 123. The generated electrons make the discharge gas excited and emit UV (ultraviolet) rays. The UV rays collide with the fluorescent material layer and emit a visible ray.

To supply the AC high voltage, a driving circuit is used. The driving circuit includes at least one driving inverter, at least one compensation inverter, at least one driving transformer and at least one compensation transformer for the first electrodes of the lamps 123, and at least one driving inverter, at least one compensation inverter, at least one driving transformer and at least one compensation transformer for the second electrodes of the lamps 123. In this example, two driving inverters 133a and 133b, two compensation inverters 137a and 137b, two driving transformers 131a and 131b and two compensation transformers 135a and 135b are used for the first electrodes of the lamps 123. Two driving inverters 133c and 133d, two compensation inverters 137c and 137d, two driving transformers 131c and 131d and two compensation transformers 135c and 135d are used for the second electrodes of the lamps 123. In particular, the driving and compensation transformers 131a to 131d and 135a to 135d are arranged in a lower portion of the LCD device.

The first to fourth driving inverters 133a to 133d are connected to the first to fourth driving transformers 131a to 131d, respectively, and the first to fourth compensation inverters 137a to 137d are connected to the first to fourth compensation transformers 135a to 135d, respectively.

The first and second driving transformers 131a and 131b are connected to the first electrodes of the rest of the lamps 124, and the third and fourth driving transformers 131c and 131d are connected to the second electrodes of the rest of the lamps 124. Connection relations between the first electrodes of the rest of the lamps 124 and the first and second driving transformers 131a and 131b and connection relations between the second electrodes of the rest of the lamps 124 and the third and fourth driving transformers 131c and 131d may be made in a number of alternative arrangements. For example, a group of the first electrodes may be connected to the first driving transformer 131a and the remaining first electrodes may be connected to the second driving transformer 131b, and similarly, a group of the second electrodes may be connected to the third driving transformer 131c and the remaining second electrodes may be connected to the fourth driving transformer 131d.

The first and second compensation transformers 135a and 135b are connected to the first electrodes of the two lowermost lamps 125a and 125b, and the third and fourth compensation transformers 135c and 135d are connected to the second electrodes of the two lowermost lamps 125a and 125b. Connection relations between the first electrodes of the two lowermost lamps 125a and 125b and the first and second compensation transformers 135a and 135b and connection relations between the second electrodes of the two lowermost lamps 125a and 125b and the third and fourth compensation transformers 135c and 135d may be made in a number of differing arrangements. For example, the first electrodes of the first and second lowermost lamps 125a and 125b may be connected to the first and second compensation transformer 135a and 135b, respectively, and similarly, the second electrodes of the first and second lowermost lamps 125a and 125b may be connected to the third and fourth compensation transformer 135c and 135d, respectively.

Each of the first to fourth driving inverters 133a to 133d has an integrated circuit including a plurality of switching devices. Each of the first to fourth driving inverters 133a to 133d converts a source voltage into an AC driving voltage by switching the switching devices according to a control signal. Each of the first to fourth driving transformers 131a to 131d boosts the AC driving voltage from each driving inverter 133a to 133d into the AC high driving voltage. The high AC driving voltages outputted from the first and second driving transformers 131a and 131b are supplied to the first electrodes of the rest of the lamps 124 electrically connected in parallel, and the high AC driving voltages outputted from the third and fourth driving transformers 131c and 131d are supplied to the second electrodes of the rest of the lamps 124 electrically connected in parallel.

Similarly to the driving inverters 133a to 133d, the first to fourth compensation inverters 137a to 137d convert a source voltage into an AC compensation voltage according to a control signal. Each of the first to fourth compensation transformers 135a to 135d boosts the AC compensation voltage from each compensation inverter 137a to 137d into the high AC compensation voltage. The high AC compensation voltages outputted from the first and second compensation transformers 135a and 135b are supplied to the first electrodes of the two lowermost lamps 125a and 125b, and the AC high compensation voltages outputted from the third and fourth compensation transformers 135c and 135d are supplied to the second electrodes of the two lowermost lamps 125a and 125b. The AC high compensation voltage has a voltage level such that distortion of the lamp currents in the lowermost lamps 125a and 125b is reduced. For example, the AC high compensation voltage may have a voltage level higher than the AC high driving voltage to reduce the distortion of the lowermost lamp currents.

As explained above, the lowermost lamps 125a and 125b are operated with the compensation transformers 135a to 135d and the compensation inverters 137a to 137d, separately from the rest of the lamps 124. In other words, the compensation transformers 135a to 135d and the compensation inverters 137a to 137d supply the high AC compensation voltages which are different from the high AC driving voltages applied to the rest of the lamps 124. Accordingly, distortion of the lamp currents due to the parasitic capacitor generated between the bent portion of the bottom cover and the lowermost lamps 125a and 125b can be compensated.

In addition, the driving and compensation transformers 131a to 131d and 135a to 135d are arranged in the lower portion of the LCD device. Accordingly, when the lamps 123 are operated, the transformers 131a to 131d and 135a to 135d generate heat in the lower portion of the LCD device. The generated heats move from the lower portion to the upper portion of the LCD device, and thus thermal convection is generated in the entire space where the lamps 123 are arranged. Therefore, the thermal convection in the entire lamp-arranged space, a substantially more uniform thermal distribution can be obtained. The uniform thermal distribution effectively reduces distortion of the uppermost lamp currents due to a parasitic capacitance generated between the bent portion of the bottom cover and the uppermost lamps. Accordingly, the uppermost lamps may not be operated with the compensation transformers 135a to 135d. In addition, the uniform thermal distribution may substantially reduce distortion of the lowermost lamp currents along with the AC compensation voltage. The amount of reduction in current distortion or temperature gradient which is obtained may depend on the size of the display, the lamp characteristics, and the specific geometry and materials of the housing. In a quantitative sense, therefore, substantially is intended to connote a meaningful change in current or temperature that may be associated with either visibly observable effects of an improvement in lamp lifetime.

In the exemplary embodiment, the two driving transformers for each of the first electrodes and the second electrodes of the rest lamps, and the two compensation transformers for each of the first electrodes and the second electrodes of the lowermost lamps are used. However, a number of the transformers is not limited providing that thermal convection is generated and distortion of the lowermost lamp currents is compensated.

In addition, the transformers may be arranged in the lower portion of the LCD device. However, the arrangement of the transformers is not limited providing that thermal convection occurs. For example, a few of the transformers may be arranged in the upper portion, and most of the transformers may be arranged in the lower portion such that the thermal convention is generated.

In addition, The compensation transformers may operate the lowermost lamps. However, it should be understood that the compensation transformers may also be used to reduce distortion of the uppermost lamp currents. In addition, a number of the outermost lamps requiring the compensation transformers may be varied according to the structure of the LCD device.

It will be apparent to those skilled in the art that various modifications and variations can be made in the LCD device and the backlight unit for the LCD or other display device of the present invention without departing from the spirit or scope of the invention. Thus, it is intended that the present invention cover the modifications and variations of this invention provided they come within the scope of the appended claims and their equivalents.

What is claimed is:

1. A display device, comprising:
a display panel;
a plurality of lamps facing the display panel and arranged in parallel from a top portion to a bottom portion of the display panel; and
a transformer connected to the plurality of lamps arranged, wherein the transformer is disposed between a predetermined portion of the display panel and the bottom portion, and wherein the predetermined portion is aligned in parallel to a length of the plurality of lamps and between the top portion and the bottom portion, and wherein the transformer includes a compensation transformer connected to a lamp of the plurality of lamps closest to the bottom portion of the diplay panel and a driving transformer connected to the plurality of lamps other than the lamp closest to the bottom portion of the display panel.

2. The device according to claim 1, wherein the compensation transformer includes a first compensation transformer and a second compensation transformer disposed at opposing ends of the lamp closest to the bottom portion of the display panel.

3. The device according to claim 2, wherein the first and second compensation transformers supply high voltages to corresponding end electrodes of the lamp of the plurality of the lamps closest to the bottom portion of the display panel.

4. The device according to claim 1, wherein the driving transformer includes a first driving transformer and a second driving transformer disposed at opposing ends of the plurality of lamps other than the lamp closest to the bottom portion of the display panel.

5. The device according to claim 4, wherein the first and second driving transformers supply high voltages to corresponding end electrodes of the plurality of lamps other than the lamp closest to the bottom portion of the display panel.

6. The device according to claim 1, wherein a number of driving transformers is less than a number of the plurality of lamps other than the lamp closest to the bottom portion of the display panel.

7. The device according to claim 1, further comprising an inverter electrically connected with the transformer.

8. The device according to claim 1, wherein the display panel is a liquid crystal panel.

9. The device of claim 1, further comprising a third compensation transformer that is connected to a lamp adjacent to the lamp closest to the bottom portion of the display panel.

10. The device of claim 9, further comprising a fourth compensation transformer disposed at an opposing end of the lamp adjacent to the lamp closest to the bottom portion of the display panel from the third compensation transformer.

11. The device of claim 1, wherein the predetermined portion of the display panel is substantially the central portion between the top portion and the bottom portion of the display panel.

12. A display device, comprising:
a display panel with a top portion and a bottom portion;
a plurality of lamps facing the display panel and arranged in parallel; and
a transformer connected to the plurality of lamps,
wherein the transformer is arranged in a space inside the display device between a predetermined portion of the display panel and the bottom portion such that thermal distribution is substantially uniform in the space due to convection of the heat generated by the transformer, and wherein the predetermined portion is aligned in parallel to a length of the plurality of lamps and between the top portion and the bottom portion, and wherein the transformer includes a compensation transformer connected to the lamp of the plurality of lamps closest to a bottom portion of the display panel and a driving transformer connected to the plurality of lamps other than the lamp closest to the bottom portion of the display panel.

13. The display device according to claim 12, wherein the compensation transformer outputting a voltage different from a voltage outputted from the driving transformer.

14. The device according to claim 13, wherein the output voltage of the compensation transformer is higher than the output voltage of the driving transformer.

15. The device of claim 12, wherein the predetermined portion of the display panel is substantially the central portion between the top portion and the bottom portion of the display panel.

\* \* \* \* \*